United States Patent [19]

Simms

[11] Patent Number: 5,590,945

[45] Date of Patent: Jan. 7, 1997

[54] ILLUMINATED LINE OF LIGHT USING POINT LIGHT SOURCE

[75] Inventor: Norman Simms, Barnegat, N.J.

[73] Assignee: Industrial Devices, Inc., Hackensack, N.J.

[21] Appl. No.: 507,121

[22] Filed: Jul. 26, 1995

[51] Int. Cl.⁶ .................................................. F21V 8/00
[52] U.S. Cl. ..................... 362/31; 362/27; 362/32; 362/310
[58] Field of Search ................... 0/26, 27, 31, 32, 0/347, 339, 348, 337, 338, 335, 336, 308, 800, 235, 80, 299, 300, 301; 40/544, 546

[56] References Cited

U.S. PATENT DOCUMENTS

| | | |
|---|---|---|
| 2,561,885 | 7/1951 | Prideaux et al. . |
| 3,497,686 | 2/1970 | Young ........................................ 362/31 |
| 3,761,704 | 9/1973 | Takeichi et al. .......................... 362/27 |
| 4,874,228 | 10/1989 | Aho et al. . |
| 4,929,866 | 5/1990 | Murata et al. . |
| 4,965,950 | 10/1990 | Yamada ................................. 362/31 X |
| 4,984,144 | 1/1991 | Cobb, Jr. et al. . |
| 5,046,826 | 9/1991 | Iwamoto et al. ......................... 362/31 |
| 5,070,431 | 12/1991 | Kitazawa et al. .................... 362/27 X |
| 5,136,480 | 8/1992 | Pristash et al. . |
| 5,165,772 | 11/1992 | Wu . |
| 5,190,370 | 3/1993 | Miller et al. . |
| 5,375,043 | 12/1994 | Tokunaga ............................. 362/32 X |
| 5,442,523 | 8/1995 | Kashima ............................... 362/26 X |

*Primary Examiner*—Ira S. Lazarus
*Assistant Examiner*—Thomas M. Sember
*Attorney, Agent, or Firm*—Barry R. Lipsitz; Ralph F. Hoppin

[57] ABSTRACT

A long, thin illuminated line of light is provided for highlighting components in an automotive dashboard or interior such as a cup holder or gearshift console. A point light source such as a surface mounted LED or incandescent lamp is located at one end of a light guide. An arcuate rear reflecting surface of the light guide causes total internal reflection of the light from the point light source and produces a uniform light display at a front viewing surface. The line of light can fit into deep recesses of a plastic molded console with minimal spacing (e.g., of only about 0.10 inches) between walls. The line of light can also be used for aesthetic or functional displays such as for consumer electronic equipment and industrial controls.

23 Claims, 2 Drawing Sheets

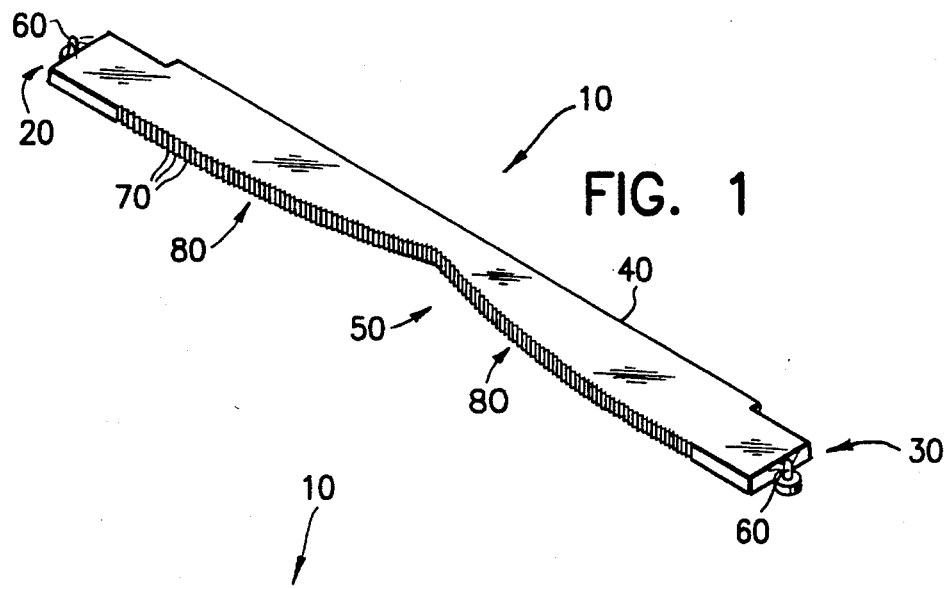
FIG. 1
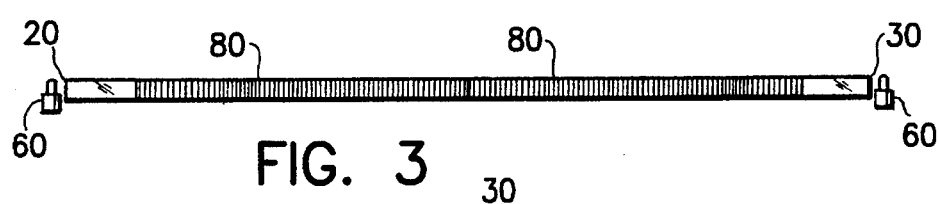
FIG. 2
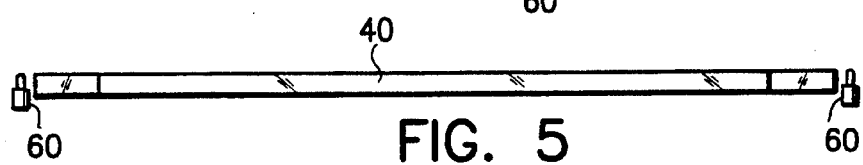
FIG. 3
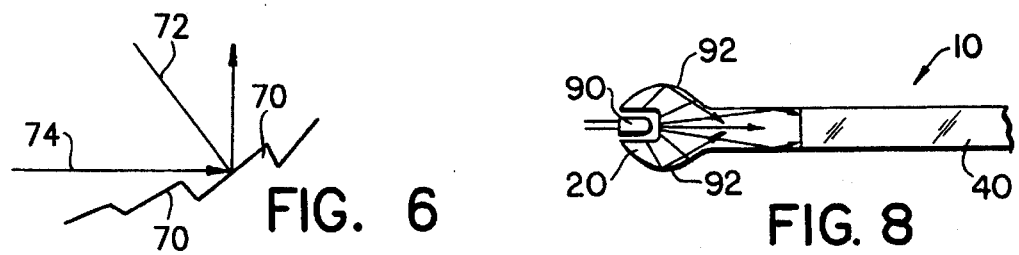
FIG. 4 · FIG. 5 · FIG. 6 · FIG. 8
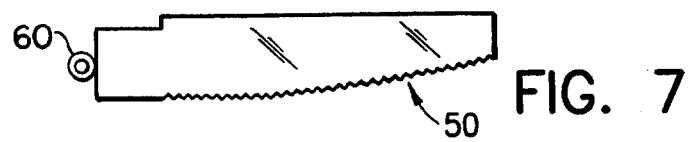
FIG. 7

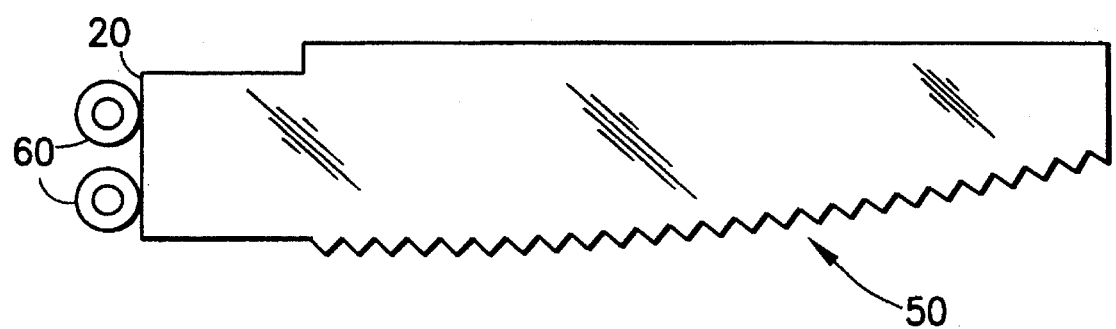

ILLUMINATED LINE OF LIGHT USING POINT LIGHT SOURCE

BACKGROUND OF THE INVENTION

The present invention relates to light displays and, more particularly, to a light guide which produces a thin line of light of a desired length. The line of light is particularly suitable for use in highlighting components in an automotive dashboard or console, or in providing a visual display in consumer or industrial electronic equipment.

A light guide is a device through which light travels. Rays of light travelling in the light guide can change direction according to the principle of total internal reflection. When a ray of light travels through one medium, such as the light guide, and strikes the boundary of a second medium with lower refractive index, such as air, total internal reflection can result if the angle of incidence is sufficiently oblique. The required angle is known as the critical angle. Moreover, the incident light ray will be reflected internally at an angle equal to the angle of incidence. The boundary of the light guide then becomes a reflecting surface. Rays from a point light source can thus be directed in a predetermined direction if the position of the light source and the geometry of the reflecting surface is known.

Light display devices which employ point sources and light guides have been used, for example, for automobile stoplights, where it is desirable to minimize the thickness of the device. Such devices may use a number of point light sources which are viewed from behind a diffuse lens which provides a display with a relatively uniform intensity. Alternatively, a continuous line of light can be produced from a laser diode module, light emitting diode module, high pressure neon tubular discharge lamp, or fiber optic array. Examples of such devices can be found in U.S. Pat. Nos. 5,165,772 and 4,929,866.

Light display devices are also used in illuminated dials, where indicia are inscribed on a display surface of a light guide. The indicia are visible due to backlighting provided by the light guide, as disclosed in U.S. Pat. No. 2,561,885. A light display device has also been used to provide an illuminated panel for examination of objects placed thereon, as shown in U.S. Pat. No. 5,136,480. Such an illuminated panel is useful in medical applications such as phototherapy.

In contrast, the present invention provides a long, thin illuminated line of light which is particularly suitable for use in highlighting components in an automotive dashboard or console, consumer product, industrial control panel, or the like. For example, a cup holder, gearshift console or other automotive accessory can be highlighted for easier viewing and location by the driver or passengers. The present invention can also be used, for instance, in producing functional or aesthetic visual displays for consumer electronic equipment. For example, one or more lines of light can be used as volume intensity or frequency spectrum displays in a home stereo system. Various other applications are possible.

SUMMARY OF THE INVENTION

The present invention employs a light guide and a point light source such as a surface mounted LED or incandescent lamp to produce a thin illuminated line of light of desired length. The device is particularly suitable for highlighting components in an automotive dashboard or interior such as a cup holder, gearshift console, or the like. The optical geometry of the light guide results in total internal reflection of the light from the point light source and produces a uniform light display over a long, thin viewing surface. The light guide can fit into deep recesses of a plastic molded console with minimal spacing (e.g., about 0.10 inches) between walls. It has low power consumption and heat generation and is long-lived.

In accordance with the present invention, a light guide defines an elongated optical cavity between first and second ends. The light guide can be constructed from polycarbonate, acrylic, or other optically clear plastic material, which may be rigid or flexible. Means are provided at one or both ends of the light guide for introducing light thereto, and may comprise a parabolic reflector for reflecting light into the light guide. A point light source can be situated adjacent to one or both ends of the light guide for providing light thereto via the light introducing means. Various types of point light sources can be used, including light-emitting diodes (LEDs) or incandescent lamps. The light guide has opposing front viewing and rear reflecting surfaces. The rear reflecting surface is arcuate and is structured with a number of ridges. The exact shape and orientation of each ridge depends on the relative position of the ridge, the light source and the viewing surface.

The rear reflecting surface is preferably generally arcuate according to the inverse square law. The ridges are triangular. Light from the point light source travels through the light guide and is reflected from the ridges on the rear reflecting surface toward the front viewing surface. This creates a substantially uniform light display on the front viewing surface which appears as a thin, illuminated line of light. The length, width and shape of the viewing surface can be modified to fit a particular application or to achieve a desired aesthetic effect. For example, the light guide can be fabricated from a flexible material that enables the viewing surface to be shaped into an arc or otherwise bent to illuminate the perimeter of an object. Alternatively, the light guide can be molded as a rigid component providing a viewing surface of a desired shape that may be straight, bent or curved. Moreover, each end of the light guide can be shaped specifically for installation in a particular application.

In one configuration, the light guide is symmetric and has point light sources located at both ends. The rear reflecting surface has two arcuate portions. Each arcuate portion is structured with ridges which act in cooperation with the respective point light sources. In another configuration, more than one point light source is used at each end of the light guide. For example, additional light sources can be used when increased illumination intensity is desired. Alternately, additional light sources may be, required to offset optical losses in longer light guides.

In another configuration, the front viewing surface can be textured or shaped to achieve a nonuniform illumination intensity. For example, a patterned effect may be achieved by making portions of the front viewing surface of the light guide opaque or semi-transparent. Similarly, the light guide itself may be impregnated with a dye to produce a colored display at the front viewing surface. Alternately, a tinted material may be placed on the front viewing surface. A multicolored light source, such as a bicolor or tricolor LED can also be used to provide different color displays using the same light guide. Other combinations of illumination intensity and color are possible.

BRIEF DESCRIPTION OF THE DRAWINGS

FIG. 1 is a perspective view of a light display in accordance with the present invention;

FIG. 2 is a top view of the light display;

FIG. 3 is a rear view of the light display;

FIG. 4 is an end view of the light display;

FIG. 5 is a front view of the light display;

FIG. 6 is a detailed view of the ridges on the rear reflecting surface of the light display;

FIG. 7 is an alternate embodiment of the light display of the present invention;

FIG. 8 is a detailed partial front view of an embodiment in which the geometry of an end of the light display accommodating a point light source is shaped to provide a parabolic reflector for efficiently coupling the light to the light guide; and FIG. 9 is another alternate embodiment of the light display device of the present invention.

DETAILED DESCRIPTION OF THE INVENTION

FIG. 1 shows a perspective view of the light guide 10 of the present invention. As shown, the light guide 10 defines an elongated optical cavity with a first end 20 and a second end 30. Light guide 10 is molded from polycarbonate, acrylic or other optically clear plastic material and has opposing front viewing surface 40 and rear reflecting surface 50. In an alternate embodiment, the light guide is fabricated from a flexible material that enables the contour of the viewing surface to be modified at installation. The length of the light guide is only limited by the output of the light source(s) used for illumination, and for embodiments in which a molded light guide is used, by constraints that dictate the maximum length of the mold. Thus, while automotive, consumer and industrial applications are expected to generally require devices of no longer than one foot or so and typically much shorter, the invention also has application-in other light strip applications such as for guide lighting on airplane floors, theaters and restaurants.

In the configuration shown, a point light source 60 is disposed adjacent to both the first end 20 and second end 30 of the light guide 10. Various types of point light sources 60 can be used in the present invention. For example, surface mount light-emitting diodes (LEDs) or incandescent lamps may be used.

The rear reflecting surface 50 is structured with a plurality of ridges 70. In the configuration shown, the light guide 10 is symmetric and has a point light source 60 disposed at both ends. The rear reflecting surface 50 has two arcuate portions 80. In one configuration, the arcuate portions are defined by the inverse square law. With the inverse square law, a two-dimensional orthogonal axis system is defined. The position along one axis is equal to the inverse square of the position along the other axis. Each arcuate portion 80 is structured with ridges 70 which act in cooperation with the respective point light sources 60. Light from the point light source 60 travels through the light guide 10 and is reflected from the ridges 70 on the rear reflecting surface 50 toward the front viewing surface 40. This creates a substantially uniform light display on the front viewing surface which appears as a thin, illuminated line of light.

The device can also be constructed to provide a nonuniform intensity along the length of the front viewing surface 40, if desired. In order to accomplish this, the dimensions of the rear reflecting surface 50 are modified in accordance with well known optical principles to reflect more light in some areas and less light in others.

FIG. 2 shows a side view of the light guide 10. In the configuration shown, the ridges 70 on the rear reflecting surface 50 are triangular. Additionally, the first end 20 and second end 30 of the light guide 10 are shaped specifically for installation in a particular application. For example, the light guide 10 can be mounted behind a panel or other surface in an automobile so that only the front viewing surface 40 is visible to the driver and passengers. In this way, the present invention provides an attractive, unobtrusive light display. Moreover, since the light guide 10 can fit into deep recesses of a plastic molded console with minimal spacing of, for example, only about 0.10 inches between walls, it does not interfere with other accessories in the vehicle.

FIG. 3 shows a rear view of the light guide 10. The point light sources 60 are situated adjacent to the first end 20 and second end 30 of the light guide 10.

FIG. 4 shows an end view of the light guide 10. In the configuration shown, the light guide 10 has a rectangular cross section. The thickness of the light guide is uniform throughout its length. For the most compact installation, the point light source 60 should have a height and width no greater than the cross sectional area of the first end 20 and second end 30 of the light guide 10.

FIG. 5 shows a front view of the light guide 10. Light from the point light source 60 is reflected from the ridges 70 (not shown) on the rear reflecting surface 50 toward the front viewing surface 40. The light then passes through the front viewing surface 40 and produces a light display thereon. The effect perceived by the viewer is that of a long, thin illuminated line of light. In one configuration, the light intensity distribution along the front viewing surface 40 is substantially uniform. Moreover, in some applications, the front viewing surface 40 is preferably substantially planar. In other applications, the front viewing surface may be arcuate. For example, in an automobile the front viewing surface may be arcuate in order to conform to the arcuate shape of a panel or other interior component. In one possible embodiment, the use of a flexible material for the light guide facilitates the shaping of the viewing surface at the time of installation of the device.

FIG. 6 shows a detailed view of the ridges 70 on the rear reflecting surface 50 of the light guide 10. In one configuration, the rear reflecting surface 50 is structured with a plurality of triangular ridges 70 thereon. The shape and orientation of each triangular ridge 70 depends on the relative position of the ridge 70, the point light source 60 and the front viewing surface 40. Generally, one face of a triangular ridge 70 is positioned such that light rays from the point light source 60 will be incident at an angle greater than the critical angle. The angle of incidence is measured here from an imaginary line 72 which is perpendicular to the face of the ridge 70 which communicates with the point light source 60.

According to the principle of total internal reflection, when a ray of light 74 travels from the point light source 60 at the first end 20 of the light guide 10 and strikes the face of one of the ridges 70, the light ray will be internally reflected if the angle of incidence is sufficiently oblique. The incident light ray will be reflected internally at an angle equal to the angle of incidence. Each ridge 70 on the rear reflecting surface 50 of the light guide 10 therefore acts as a reflecting surface. Light reflected from the ridges 70 on the rear reflecting surface 50 toward the front viewing surface 40 create a substantially uniform light display on the front viewing surface which appears as a thin, illuminated line of light.

FIG. 7 shows an alternate embodiment of the present invention. The light guide 10 is provided with only one arcuate rear reflecting surface 50 and one point light source 60. This configuration is desirable for shorter light displays where optical losses in the light guide 10 are minimal. Thus, a substantially uniform light display is still produced at the front viewing surface 40. Moreover, this configuration is desirable for applications where space limitations prevent installation of additional wiring to a point light source at the opposite end of the light guide 10.

FIG. 8 illustrates a detailed end view of an implementation of the light display device in which the light source, such as an LED 90, is received in a recess of the end 20 of light guide 10. The end 20 has parabolic side walls 92 that reflect stray light from source 90 back into the light guide, thereby enhancing the efficiency of the device. In an embodiment where light is introduced at both ends of the light guide, both ends are preferably shaped to provide such parabolic reflection.

FIG. 9 is another alternate embodiment of the light display device of the present invention. As shown, a plurality of point light source 60 are provided adjacent to the first end 20 of the light guide.

While the invention has been described in connection with a preferred embodiment, it is not intended to limit the scope of the invention to the particular form set forth, but, on the contrary, it is intended to cover such alternatives, modifications and equivalents as may be included within the spirit and scope of the invention as defined by the appended claims.

What is claimed is:

1. A light display device, comprising:

a light guide defining an elongated optical cavity;

said light guide having a first end and a second end:

said light guide having opposing front viewing and rear reflecting surfaces:

said rear reflecting surface being curved over at least a substantial portion of said light guide;

a plurality of reflecting ridges disposed on said rear reflecting surface;

said ridges being substantially uniformly distributed along said substantial portion of said light guide;

at least one of said reflecting ridges extending across a width of said rear reflecting surface;

means adjacent to said first end of said light guide for introducing light into said light guide;

wherein said reflecting ridges of said rear reflecting surface reflect light introduced via said introducing means toward said front viewing surface to create a light display thereon.

2. The light display device of claim 1 wherein said light introducing means are adapted to receive said light from point light source.

3. The light display device of claim 1 wherein said light introducing means are adapted to receive said light from a plurality of point light sources adjacent to said first end of said light guide and extending sequentially along a height of said light guide, said height being the distance from said rear reflecting surface to said front viewing surface, and said rear reflecting surface is adapted to reflect light from said point light sources toward said front viewing surface to provide a light display thereon.

4. The light display device of claim 1 wherein said front viewing surface is substantially planar.

5. The light display device of claim 1 wherein said front viewing surface is structured to produce a nonuniform light display.

6. The light display device of claim 1 wherein said reflecting ridges have a triangular cross-section.

7. The light display device of claim 6 wherein said rear reflecting surface is arcuate according to an inverse square law to achieve a substantially uniform light display on said front viewing surface.

8. The light display device of claim 6, wherein said ridges are substantially contiguously distributed along said rear reflecting surface.

9. The light display device of claim 6, wherein said ridges are substantially uniform in size.

10. The light display device of claim 1 further comprising means adjacent to said second end of said light guide for introducing light into said light guide for reflection by said rear reflecting surface toward said front viewing surface.

11. The light display of claim 10 wherein said means adjacent said second end are adapted to receive light from at least one point light source.

12. The light display of claim 8 wherein:

at least one of said means for introducing light comprise opposing first and second parabolic reflectors for reflecting received light into said light guide;

said opposing first and second parabolic reflectors define a receiving port therebetween, said receiving port extending substantially parallel to a longitudinal axis of said light guide from a terminus which is proximate to said first end to an opening which is distal from said first end; and a light source for producing said light is receivable in said receiving port via said opening.

13. The light display device of claim 10 wherein said rear reflecting surface comprises a first arc for reflecting light introduced at said first end toward said front viewing surface and a second arc for reflecting light introduced at said second end toward said front viewing surface, said first and second arcs forming a V shape.

14. The light display device of claim 3 wherein said first and second arcs are arcuate according to an inverse square law to achieve a substantially uniform light display on said front viewing surface.

15. The light display device of claim 14 wherein said front viewing surface is shaped to provide a thin line of light.

16. The light display device of claim 15 wherein said light guide has a substantially rectangular cross section.

17. The light display of claim 13 wherein said rear reflecting surface is symmetrical about a central region of said V shape.

18. The light display device of claim 1 wherein said front viewing surface is shaped to provide a thin line of light.

19. The light display device of claim 1 wherein:

said means for introducing light comprise opposing first and second parabolic reflectors for reflecting received light into said light guide;

said opposing first and second parabolic reflectors define a receiving port therebetween, said receiving port extending substantially parallel to a longitudinal axis of said light guide from a terminus which is proximate to said first end to an opening which is distal from said first end; and a light source for producing said light is receivable in said receiving port via said opening.

20. The light display device of claim 1 wherein said light guide is flexible.

21. The light display device of claim 1 further comprising a first point light source for introducing light at said first end and a second point light source for introducing light at said second end, said rear reflecting surface being symmetrical to provide a substantially uniform illumination across said front viewing surface.

22. A light display device, comprising:

a light guide defining an elongated optical cavity;

said light guide having a first end and a second end;

said light guide having opposing front viewing and rear reflecting surfaces;

said rear reflecting surface being curved over at least a substantial portion of said light guide according to an inverse square law to achieve a substantially uniform light display on said front viewing surface;

a plurality of reflecting ridges disposed on said rear reflecting surface;

at least one of said reflecting ridges extending across a width of said rear reflecting surface;

means adjacent to said first end of said light guide for introducing light into said light guide;

wherein said reflecting ridges of said rear reflecting surface reflect light introduced via said introducing means toward said front viewing surface to create a light display thereon.

23. The light display device of claim 22, wherein said ridges are substantially uniformly distributed along said rear reflecting surface.

* * * * *